(12) United States Patent
Tsujikawa (10) Patent No.: US 10,915,007 B2
(45) Date of Patent: Feb. 9, 2021

(54) IMAGING APPARATUS

(71) Applicant: FUJITSU FRONTECH LIMITED, Tokyo (JP)

(72) Inventor: Akinori Tsujikawa, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 178 days.

(21) Appl. No.: 16/195,136

(22) Filed: Nov. 19, 2018

(65) Prior Publication Data
US 2019/0086770 A1 Mar. 21, 2019

Related U.S. Application Data

(63) Continuation of application No. PCT/JP2016/067143, filed on Jun. 8, 2016.

(51) Int. Cl.
*G03B 15/02* (2021.01)
*G03B 15/05* (2021.01)
*G03B 15/03* (2021.01)

(52) U.S. Cl.
CPC ............. *G03B 15/05* (2013.01); *G03B 15/03* (2013.01); *G03B 2215/0503* (2013.01); *G03B 2215/0575* (2013.01); *G03B 2215/0592* (2013.01)

(58) Field of Classification Search
CPC ........ G03B 15/02; G03B 15/03; G03B 15/05; G03B 2215/0575; G03B 2215/0567; G03B 2215/0589; G03B 2215/0592; G03B 2215/0503; G06K 9/2027; F21V 9/14; G01N 2021/8848
See application file for complete search history.

(56) References Cited

U.S. PATENT DOCUMENTS

| 4,070,096 A * | 1/1978 | Jasgur .................. F21V 9/14 362/19 |
| 6,033,087 A | 3/2000 | Shozo et al. |
| 2007/0206114 A1 | 9/2007 | Tanaka et al. |
| 2008/0230681 A1 | 9/2008 | Yoshizu et al. |
| 2013/0128104 A1* | 5/2013 | Nunnink .............. G03B 15/05 362/7 |
| 2014/0160300 A1 | 6/2014 | Hung |

FOREIGN PATENT DOCUMENTS

| CN | 101030014 A | 9/2007 |
| EP | 1830307 A1 | 9/2007 |
| JP | 05007320 A | 1/1993 |
| JP | 2002077694 A | 3/2002 |
| JP | 2007235863 A | 9/2007 |

(Continued)

OTHER PUBLICATIONS

Office action issued in corresponding Chinese patent application No. 201680086147.4 (full machine translation).

(Continued)

*Primary Examiner* — Y M. Quach Lee
(74) *Attorney, Agent, or Firm* — Greer Burns & Crain Ltd.

(57) ABSTRACT

An imaging apparatus includes an imaging element, a lens unit that focuses light on the imaging element, and a light source disposed around the lens unit. The lens unit includes a blocking part that projects over a region located around the lens unit and facing the light source so as to block stray light from the light source.

4 Claims, 7 Drawing Sheets

(56) References Cited

FOREIGN PATENT DOCUMENTS

| | | |
|---|---|---|
| JP | 2008233796 A | 10/2008 |
| JP | 2010055023 A | 3/2010 |

OTHER PUBLICATIONS

ISR issued in Int'l. Application No. PCT/JP2016/067143, dated Sep. 13, 2016.
Written Opinion of the International Searching Authority of PCT/JP2016/067143 (partial English translation).
Office action issued in corresponding Japanese patent application No. 2018-522247, dated Aug. 6, 2019 (with full machine translation).
EESR issued in corresponding EP patent application No. 16904635.6, dated May 8, 2019.

* cited by examiner

ND APPARATUS

CROSS-REFERENCE TO RELATED APPLICATION

This application is continuation application of International Application PCT/JP2016/067143 filed on Jun. 8, 2016 and designated the U.S., the entire contents of which are incorporated herein by reference.

TECHNICAL FIELD

The embodiments discussed herein are related to an imaging apparatus.

BACKGROUND ART

Conventionally, an imaging apparatus that includes a lens unit disposed on a wiring board, a plurality of light emitters disposed around the lens unit, and a light guide body disposed on an optical path specific to the plurality of light emitters has been used for a biometrics authentication apparatus that performs authentication based on biological information such as palm or finger veins, fingerprints, or pupil irises. As such an imaging apparatus, a known imaging apparatus further includes a light shield body called a hood that is disposed around a lens unit and blocks light that could enter the lens unit (see, for example, Japanese Laid-open Patent Publication No. 2008-233796).

SUMMARY OF THE INVENTION

A disclosed imaging apparatus includes an imaging element, a lens unit that focuses light on the imaging element, and a light source disposed around the lens unit, wherein the lens unit includes a shield part that projects over a region located around the lens unit and facing the light source so as to block stray light from the light source.

EMBODIMENTS

In an imaging apparatus that includes the above-mentioned light shield body, the light shield body is disposed over a light guide body. Hence, especially when the distance between the plurality of light emitters and the lens unit is made to be short to accommodate the need to downsize an apparatus, light from the light emitters could be reflected from the light shield body or a wiring board and pass through a space between the light emitters and a hood and thus could enter the body of the lens unit.

A disclosed imaging apparatus is capable of preventing stray light from a light source disposed around a lens unit from entering the lens unit.

The following describes an imaging apparatus 1 in accordance with an embodiment by referring to the drawings.

The imaging apparatus 1 emits light to a subject (e.g., a palm) and receives, at an imaging element 91, the light reflected from the subject so as to capture an image. The imaging element 91 is, for example, an image sensor.

Figure 1:
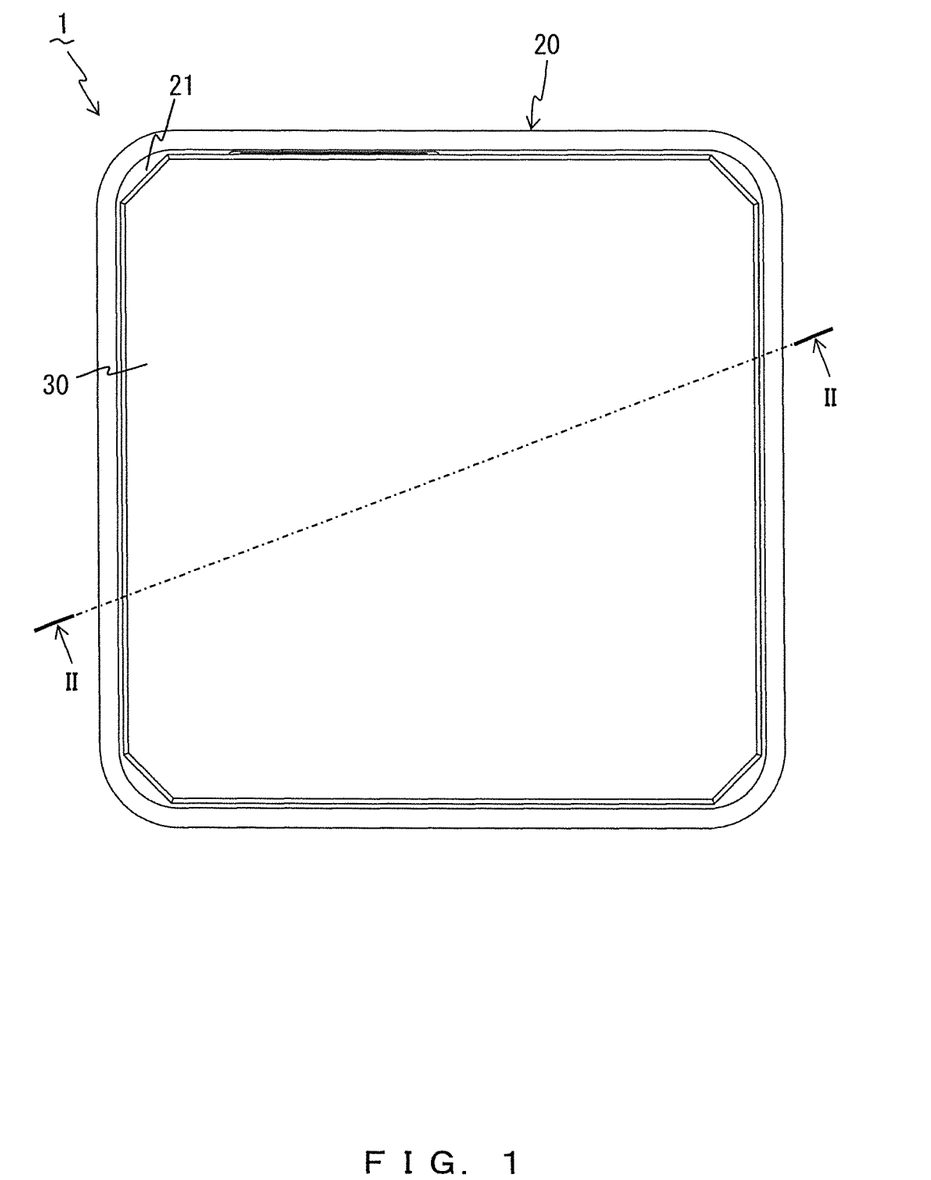
FIG. 1 is a plane view illustrating an imaging apparatus in accordance with an embodiment.

FIG. 1 is a plane view illustrating the imaging apparatus 1.

Figure 2:
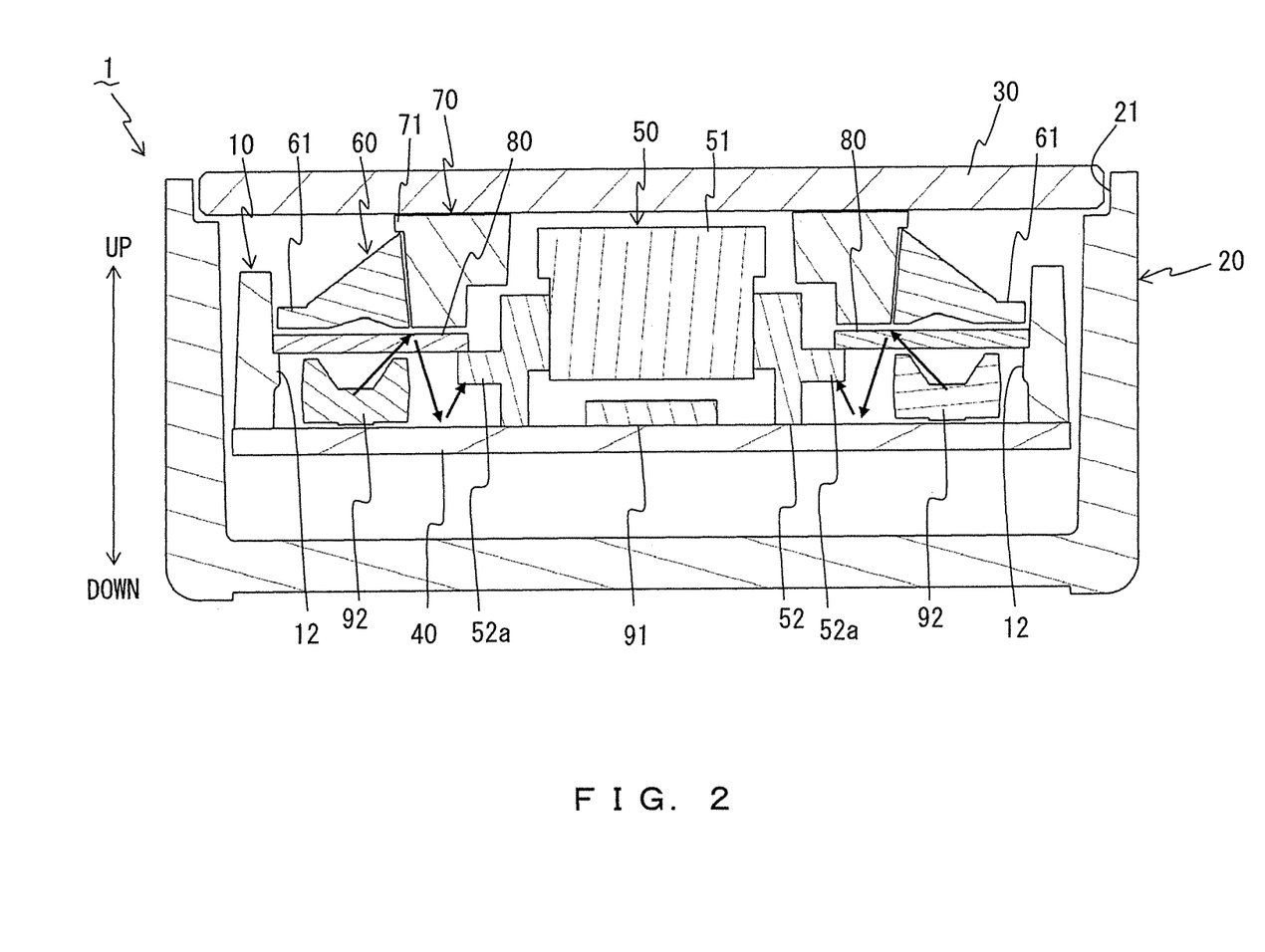
FIG. 2 is a cross-sectional view taken on line II-II of FIG. 1.

FIG. 2 is a cross-sectional view taken on line II-II of FIG. 1.

Figure 3:
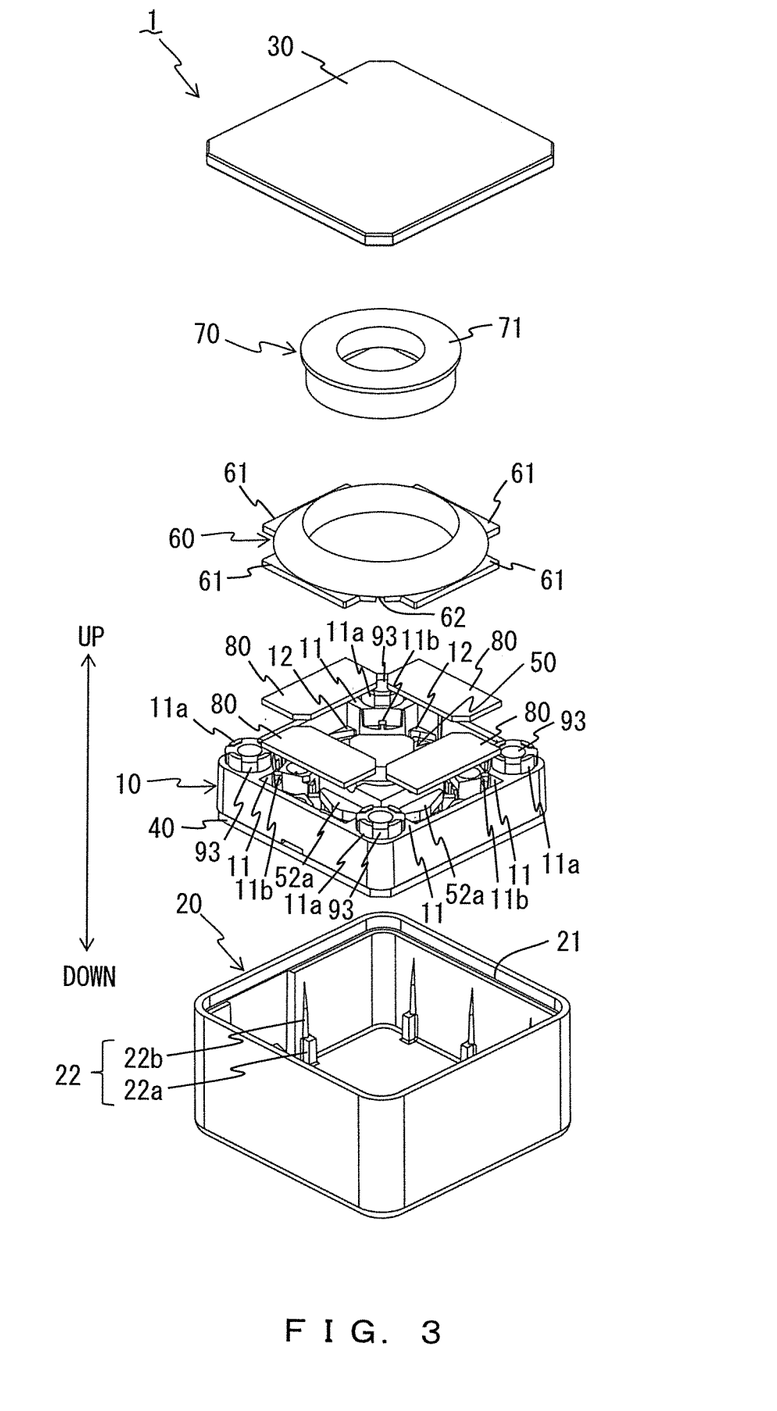
FIG. 3 is an exploded perspective view illustrating an imaging apparatus in accordance with an embodiment.

FIG. 3 is an exploded perspective view illustrating the imaging apparatus 1.

As depicted in FIGS. 2 and 3, the imaging apparatus 1 includes an aperture 10 that corresponds to an exemplary framing member, a housing 20, a top cover 30, a wiring board 40, a lens unit 50, a light guide body 60, a light shield body 70, four polarization members 80, an imaging element 91, eight (a plurality of) illumination light emitters 92 that each correspond to an exemplary light source, and four ranging lenses 93 (see FIG. 3).

The imaging apparatus 1 is used as a biometrics authentication apparatus that performs authentication by capturing an image of a palm vein or as a portion of the biometrics authentication apparatus. However, the imaging apparatus 1 may be an imaging apparatus that captures an image of another type of biological information such as finger veins, fingerprints, or pupil irises or may be an imaging apparatus that captures an image of a subject that is not biological information.

Figure 4:
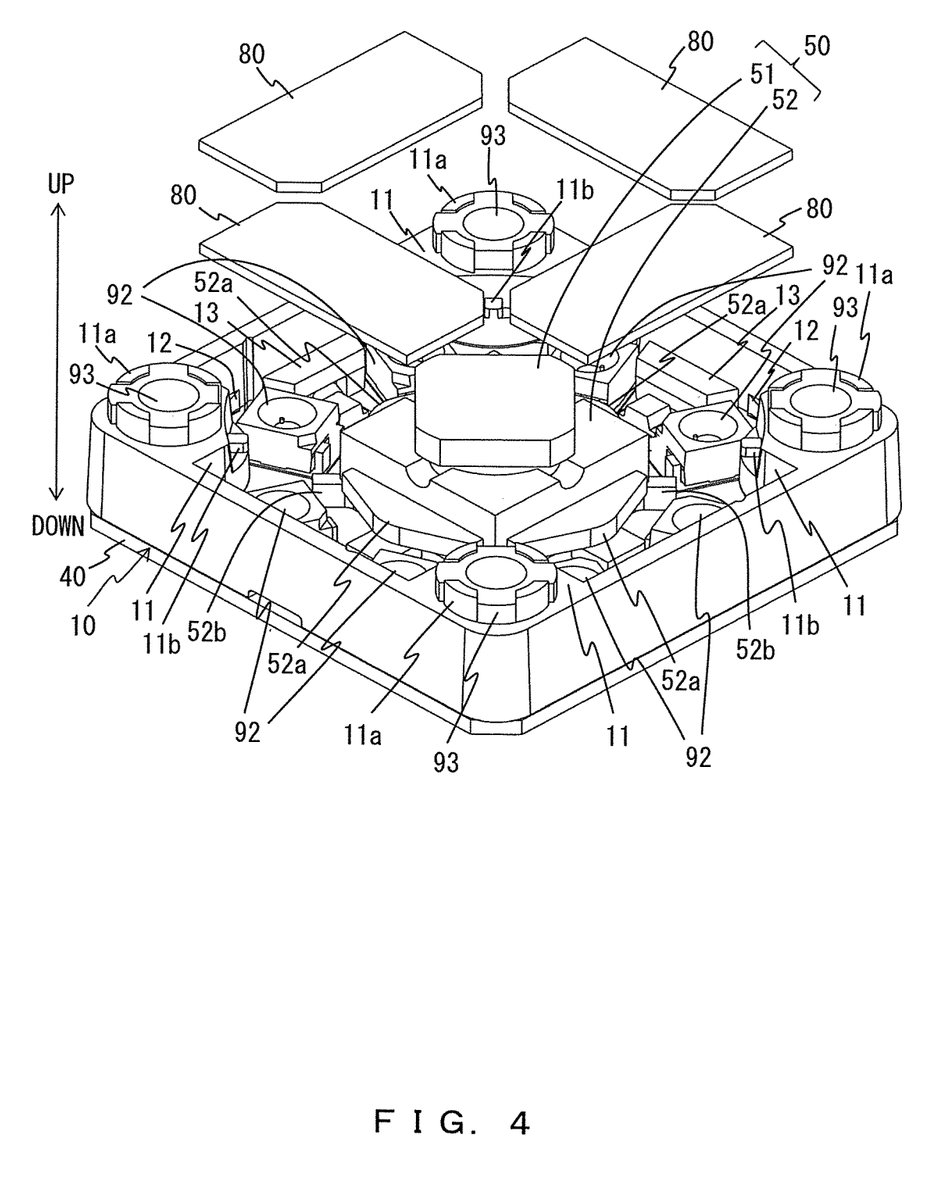
FIG. 4 is a perspective view illustrating a placed state of a polarization member in accordance with an embodiment.
Figure 5:
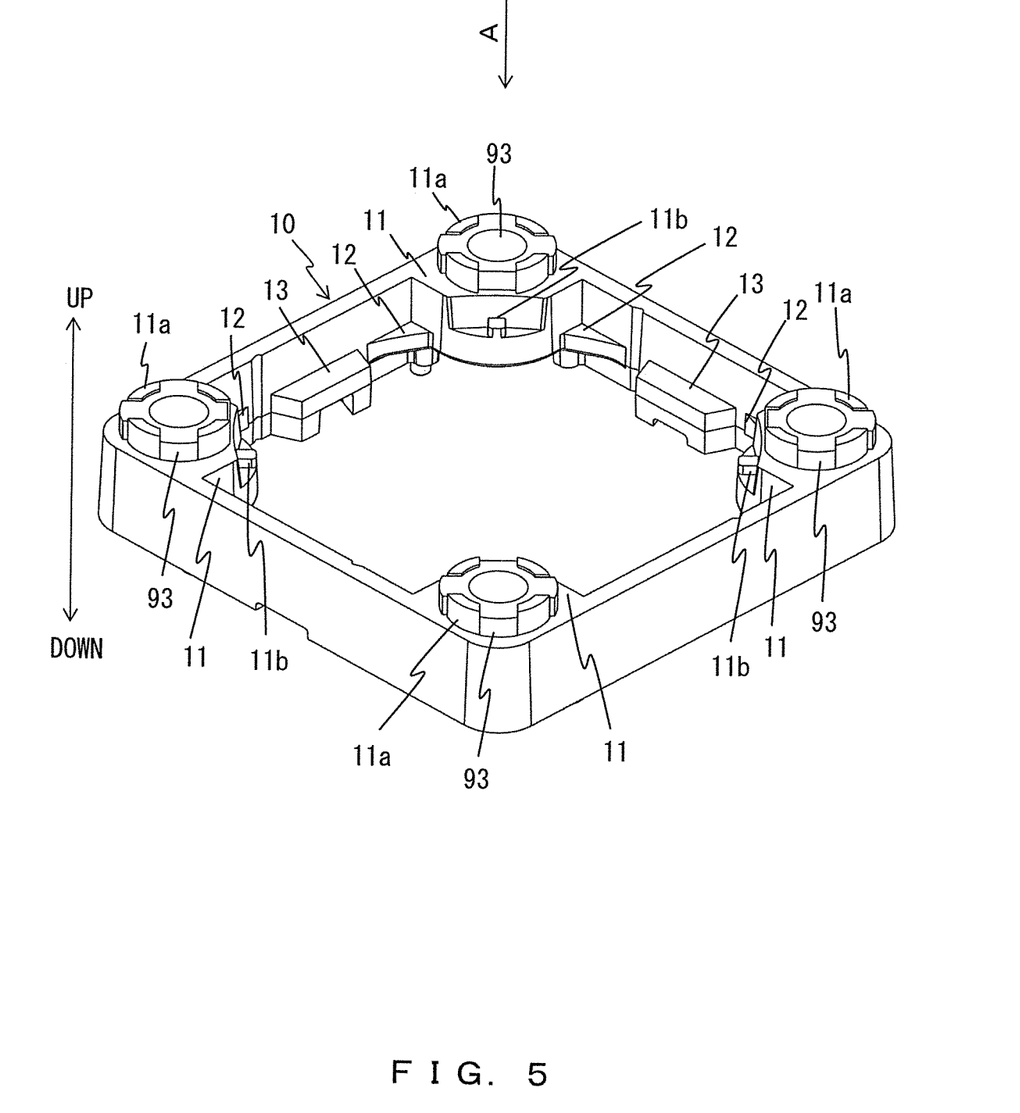
FIG. 5 is a perspective view illustrating an aperture in accordance with an embodiment.

As depicted in FIGS. 2-4, the aperture 10 has a rectangular frame shape (rectangular hollow shape) provided on the outer edge of the wiring board 40 in such a manner as to surround the lens unit 50, the eight illumination light emitters 92, and the like. As depicted in FIGS. 4 and 5, swelling parts 11 swelling toward a center on a lens-unit-50 side are provided at four corners of the aperture 10.

The swelling part 11 has provided therein a through bore (not illustrated) through which light emitted upward from a ranging light emitter (e.g., a LED) (not illustrated) mounted on the wiring board 40 passes. The ranging lens 93 is disposed over the through bore.

As depicted in FIG. 5, the swelling parts 11 are each provided with four press-fit convex parts 11a which project upward and into which the ranging lens 93 that assumes an X shape when seen in a plane view is pressed from above. The expression "when seen in a plane view" in the present embodiment refers to a situation in which an object is seen in an optical-axis direction of the lens unit 50 from a side opposite to the imaging element 91 (direction A), and the position opposite to the position of the imaging element 91 may be expressed as "upward", "above", or "higher position" herein.

An engagement convex part 1ib that projects upward and that engages an engagement concave part 62 of the light guide body 60 depicted in FIG. 3 is provided at a portion of the swelling part 11 on the lens-unit-50 side (the center side of the apparatus 1).

As depicted in FIG. 5, eight polarization plate supporting parts 12 which are positioned to sandwich the four swelling parts 11 and on which corners of the polarization members 80 are placed are provided on the inner surfaces of the aperture 10. Meanwhile, four polarization plate supporting parts 13 on each of which a central portion of one edge of the polarization member 80 is placed are also provided on inner surfaces at the centers of four edges of the aperture 10 as seen in a plane view.

As depicted in FIGS. 2 and 3, the housing 20 has a rectangular box shape without a top surface. A concave top cover supporting portion 21 at a center side and an upper side on which the outer edge of the top cover 30 is placed is provided at an upper edge of the housing 20.

As depicted in FIG. 3, a plurality of board supporting parts 22 on which the wiring board 40 is placed are provided on the inner surface of the housing 20. The board supporting part 22 includes a supporting convex part 22a having a rectangular solid shape projecting toward the center, and a guide convex part 22b wherein portions of the guide convex part 22b located at a higher position, i.e., portions of the guide convex part 22b more distant from the supporting convex part 22a, has a smaller amount of projection. The guide convex part 22b guides onto the supporting convex part 22a the wiring board 40 inserted into the housing 20 from above together with the aperture 10. A plurality of board supporting parts 22 are provided so that the plurality of guide convex parts 22b can hold the wiring board 40 in a surrounding manner.

As depicted in FIG. 3, the top cover 30 has a rectangular plate shape. As depicted in FIGS. 2-4, the top cover 30 is formed of a translucent material for allow passage of light such as irradiation light emitted from the illumination light emitter (e.g., a LED) 92 toward a subject (e.g., a palm vein) or reflection light from the subject. As described above, the top cover 30 is placed on the top cover supporting portion 21 at the outer edge of the housing 20 and supported by the housing 20 at the top cover supporting portion 21.

As depicted in FIG. 2, the imaging element 91, the lens unit 50, and the eight illumination light emitters 92 are mounted on the wiring board 40. Only one illumination light emitter 92 may be mounted when the illumination light emitter 92 assumes a ring shape surrounding the lens unit 50.

Mounting a part such as a central processing unit (CPU) or a memory on the wiring board 40 allows the wiring board 40 to function as a controller for the imaging apparatus 1. When the imaging apparatus 1 is used as a biometrics authentication apparatus, the wiring board 40 may function as a controller for the biometrics authentication apparatus.

As depicted in FIG. 2, the lens unit 50 includes a lens body 51 and a lens supporting member 52 for supporting a lower portion of the lens body 51, wherein the lens unit 50 focuses light on the imaging element 91. In one example, the lens body 51 and the lens supporting member 52 each assume a rectangular shape when seen in a plane view as depicted in FIG. 6.

Figure 6:
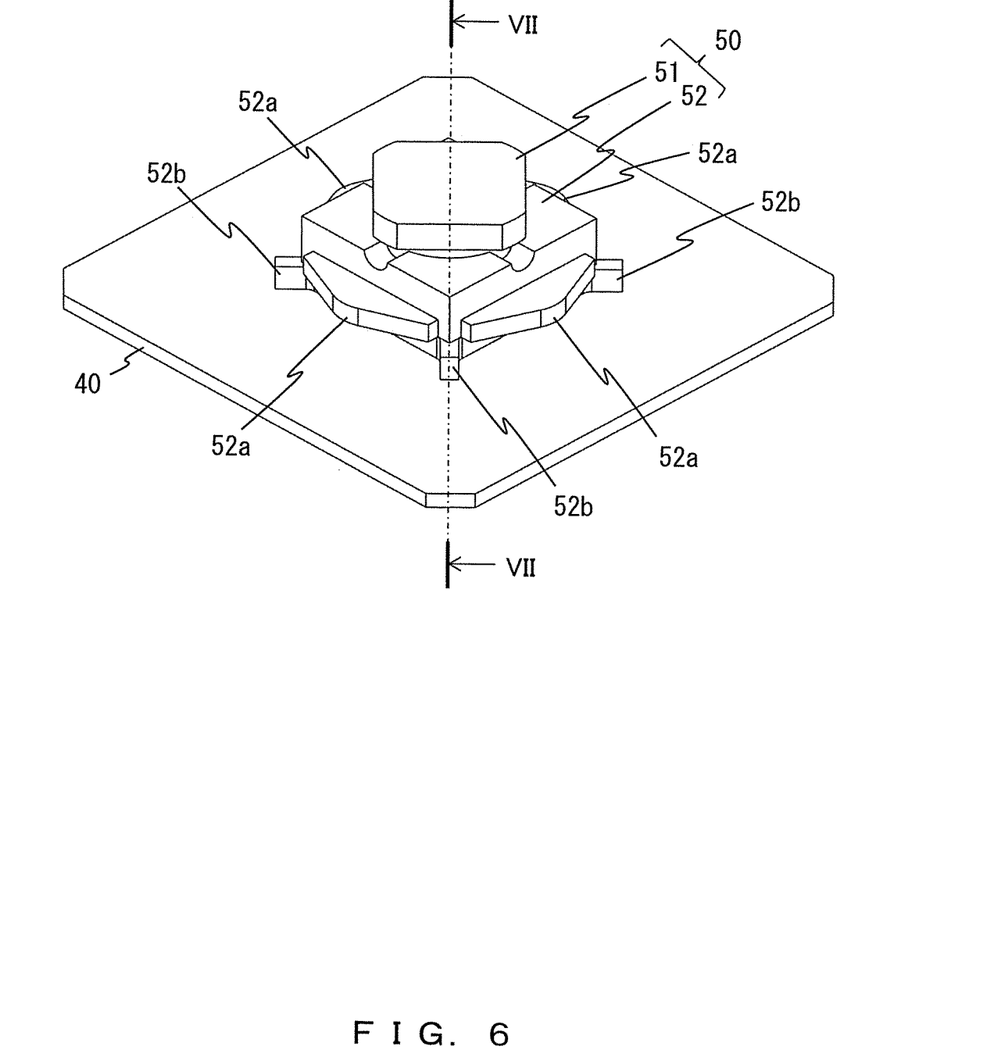
FIG. 6 is a perspective view illustrating a lens unit in accordance with an embodiment.

As depicted in FIG. 6, the lens supporting member 52 includes four blocking parts 52a and four joined parts 52b.

As depicted in FIG. 4, the four blocking parts 52a are disposed on four side surfaces of the lens supporting member 52 and projects in such a manner as to assume an essentially triangular shape when seen in a plane view. The four blocking parts 52a each project over a region facing two of the eight illumination light emitters 92. Accordingly, the four blocking parts 52a are provided on essentially the entirety of the side surfaces of the lens unit 50. When seen in a plane view, the blocking part 52a may project over a region located around the lens unit 50 and facing the illumination light emitter 92, and, for example, may project above the illumination light emitter 92.

The arrows depicted in FIG. 2 represent examples of stray light. The stray light is reflected from a lower edge of the light shield body 70 and then from an upper surface of the wiring board 40 and travels toward the lens body 51.

The blocking part 52a blocks stray light from the illumination light emitter 92 (arrow).

As depicted in FIG. 2, the four blocking parts 52a each have a corresponding polarization member 80 placed thereon. When the polarization member 80 is omitted from the imaging apparatus 1, another member such as the light shield body 70 may be placed on the blocking part 52a.

As depicted in FIG. 6, the four joined parts 52b project onto the wiring board 40 from portions of the side surfaces of the lens supporting member 52 as seen in a plane view at which the lens body 51 is not provided (e.g., from four corners).

Figure 7:
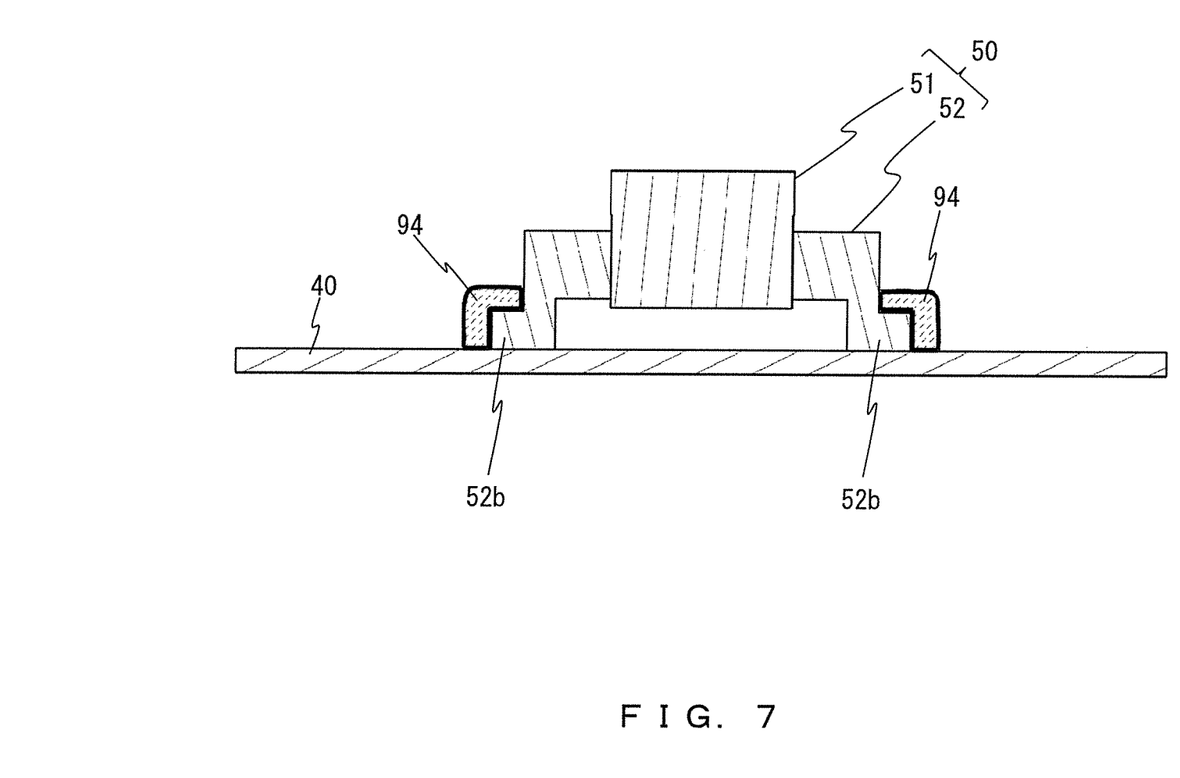
FIG. 7 is a cross-sectional view taken on VII-VII line of FIG. 6.

FIG. 7 is a cross-sectional view taken on VII-VII line of FIG. 6. As depicted in FIG. 7, the joined parts 52b are joined to the wiring board 40 by an adhesive 94 that corresponds to an exemplary joining material. The adhesive 94 is an adhesive for electrical/electronic parts (e.g., a room temperature curing one-compound elastic adhesive based on silicone-modified polymer). Instead of causing the joined parts 52b to adhere using the adhesive 94, the lens unit 50 may be fixed to the wiring board 40 using another joining technique such as welding.

The light guide body 60 is toric as depicted in FIG. 3 and guides light emitted from the illumination light emitter 92 depicted in FIG. 2 to a subject through the top cover 30. The light guide body 60 desirably diffuses light emitted from the illumination light emitter 92. The top surface of the light guide body 60 is inclined downward from the inner surface of the body to the outer boundary.

Four rectangular-plate-shaped flange parts 61 projecting in four directions are provided around the light guide body 60. The four flange parts 61 are inserted from above the aperture 10 in such a manner as to face the four inner surfaces of the aperture 10 without interfering with, or being interfered with by, the swelling parts 11 of the aperture 10 and are placed on the polarization members 80. As a result, the light guide body 60 is positioned for four orientations arranged at 90-degree intervals. In a space between every pair of two adjacent flange parts 61 of the light guide body 60, the four engagement concave parts 62 provided around the light guide body 60 each engage the engagement convex part 1b of the swelling part 11, as described above.

The light shield body 70 has a cylindrical shape as depicted in FIG. 3 and is located around the lens body 51 so as to block light as depicted in FIG. 2. A flange part 71 projects from the entirety of the upper edge of the side surface of the light shield body 70. The light shield body 70 is sent to the inside of the light guide body 60 from above, and the flange part 71 is placed on the light guide body 60.

As described above, the four polarization members 80 are each placed on one blocking part 52a of the lens unit 50 and on two polarization plate supporting parts 12 and one polarization plate supporting part 13 of the aperture 10. As a result, as depicted in FIG. 2, the four polarization members 80 are located on an optical path of light emitted from the illumination light emitter 92, i.e., located above the illumination light emitter 92.

In the embodiment described above, the imaging apparatus 1 includes an imaging element 91, a lens unit 50 that focuses light on the imaging element 91, and eight illumination light emitters 92 that correspond to exemplary light sources disposed around the lens unit 50. The lens unit 50 includes a blocking part 52a that projects over a region located around the lens unit 50 and facing the illumination light emitter 92 so as to block stray light from the illumination light emitter 92.

The blocking part 52a that projects over a region located around the lens unit 50 and facing the illumination light emitter 92 blocks, as described above, stray light from the illumination light emitter 92 and thus can prevent the stray light from entering the lens body 51 within the lens unit 50. Hence, in the embodiment, stray light from the illumination light emitters 92 disposed around the lens unit 50 can be prevented from entering the lens body 51 within the lens unit 50.

In the embodiment, the imaging apparatus 1 further includes polarization members 80 disposed on an optical path of light emitted from the illumination light emitters 92, and the polarization members 80 are placed on the blocking parts 52a of the lens unit 50. The blocking part 52a on which the polarization member 80 is placed as described above blocks stray light from the illumination light emitter 92, so that the stray light can be prevented from entering the lens body 51 within the lens unit 50 without increasing the parts count with the configuration maintained simple. In addition, the blocking part 52a projects over a region located around the lens unit 50 and facing the illumination light emitter 92, and hence the polarization member 80 can be prevented from shaking by increasing the area of the blocking part 52a on which the polarization member 80 is placed.

In the embodiment, the imaging apparatus 1 further includes an aperture 10 that corresponds to an exemplary framing member surrounding the lens unit 50 and the illumination light emitter 92. The aperture 10 includes polarization plate supporting parts 12 and 13 which are provided on the inner surfaces of the aperture 10 and on which the polarization members 80 are placed. Hence, the polarization members 80 can be reliably supported.

In the embodiment, the lens unit 50 includes a lens body 51 and a lens supporting member 52 for supporting the lens body 51, and blocking parts 52a project from the side surfaces of the lens supporting member 52. Hence, stray light can be prevented from entering the lens body 51 within the lens unit 50 with the configuration maintained simple.

In the embodiment, the imaging apparatus 1 further includes an imaging element 91, a lens unit 50, and a wiring board 40 on which a illumination light emitter 92 is mounted, and the lens unit 50 further includes joined parts 52b projecting from the side surfaces of the lens unit 50 onto the wiring board 40 and joined to the wiring board 40. Hence, the adhesive 94 may be applied to the joined part 52b in such a manner as to press the joined part 52b downward to join the wiring board 40 and the lens unit 50. This allows the lens unit 50 to be strongly fixed to the wiring board 40. In particular, this can enhance the resistance of a portable imaging apparatus 1 against dropping impacts or the like.

The present invention is not limited to the described embodiments and can be embodied by making changes to the components without departing the gist of the invention in an implementation phase. Various inventions can be formed by combining, as appropriate, a plurality of components disclosed with reference to an embodiment. For example, all of the components indicated in an embodiment may be combined as appropriate. In this way, various changes or applications are possible without departing from the spirit of the invention.

The invention claimed is:

1. An imaging apparatus comprising:
an imaging element;
a lens unit that includes a lens body and a lens supporting member for supporting the lens body and that focuses light on the imaging element; and
a light source disposed around the lens unit,
a light shield body located around the lens body so as to block light; and
a wiring board on which the imaging element, the lens unit, and the light source are mounted, wherein
the lens unit includes a blocking part that projects over a region located around the lens supporting member and facing the light source so as to block stray light from the light source, the stray light being reflected from the light shield body and the wiring board and traveling toward the lens body.

2. The imaging apparatus of claim 1, further comprising:
a polarization member disposed on an optical path of light emitted from the light source, wherein
the polarization member is placed on the blocking part of the lens unit.

3. The imaging apparatus of claim 2, further comprising:
a framing member surrounding the lens unit and the light source, wherein
the framing member includes a polarization plate supporting part which is provided on an inner surface of the framing member and on which the polarization member is placed.

4. The imaging apparatus of claim 1, wherein
the lens unit further includes a joined part projecting from a side surface of the lens supporting member onto the wiring board and joined to the wiring board.

\* \* \* \* \*